United States Patent
Tellinger et al.

(10) Patent No.: US 6,792,273 B1
(45) Date of Patent: *Sep. 14, 2004

(54) METHOD AND APPARATUS FOR RESOURCE RESERVATION IN A MOBILE RADIO COMMUNICATION SYSTEM

(75) Inventors: Jan Tellinger, Älvsjö (SE); Göran Engman, Järfälla (SE); Stefan Wahlman, Kista (SE); Pär Gustavsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/335,047

(22) Filed: Jun. 16, 1999

(30) Foreign Application Priority Data

Dec. 18, 1998 (WO) .............................. PCT/IB98/02078

(51) Int. Cl.⁷ ................................................ H04Q 7/20
(52) U.S. Cl. ...................... 455/442; 455/445; 455/443; 370/331
(58) Field of Search ................................ 455/436, 437, 455/438, 439, 440, 441, 442, 450, 451, 452, 560, 445, 453, 452.1, 452.2; 370/331, 252, 254

(56) References Cited

U.S. PATENT DOCUMENTS

| | | | |
|---|---|---|---|
| 5,166,927 A | * 11/1992 | Iida et al. .................... | 370/238 |
| 5,276,911 A | 1/1994 | Levine et al. | |
| 5,420,909 A | 5/1995 | Ng et al. | |
| 5,490,165 A | 2/1996 | Blakeney, II et al. | |
| 5,537,394 A | * 7/1996 | Abe et al. ..................... | 370/17 |
| 5,574,969 A | * 11/1996 | Olds et al. ................. | 455/12.1 |
| 5,682,601 A | 10/1997 | Sasuta | |
| 5,684,793 A | 11/1997 | Kiema et al. | |
| 5,719,860 A | 2/1998 | Maison et al. | |
| 5,867,109 A | 2/1999 | Wiedeman | |
| 6,141,534 A | * 10/2000 | Snell et al. ................. | 455/12.1 |
| 6,195,342 B1 | * 2/2001 | Rohani ....................... | 370/331 |
| 6,223,041 B1 | * 4/2001 | Egner et al. ................ | 455/452 |
| 6,230,013 B1 | * 5/2001 | Wallentin et al. ........... | 455/436 |
| 6,311,065 B1 | * 10/2001 | Ushiki et al. ............... | 342/457 |
| 6,332,077 B1 | * 12/2001 | Wu et al. .................... | 455/432 |
| 6,347,091 B1 | * 2/2002 | Wallentin et al. ........... | 370/437 |

FOREIGN PATENT DOCUMENTS

WO        96/08119 A      3/1996

\* cited by examiner

*Primary Examiner*—Quochien B. Vuong
*Assistant Examiner*—Tanmay Lele
(74) *Attorney, Agent, or Firm*—Nixon & Vanderhye P.C.

(57) ABSTRACT

Resources are reserved or otherwise allocated in a mobile radio communications system in an efficient and timely fashion. In general, the amount of resources that will likely be necessary to support a connection with a mobile station is predicted before those resources are actually required. More specifically, an unknown value of a dynamic connection parameter, like a number of radio paths likely to be involved in supporting the connection, is predicted. In the handover context, these radio paths might correspond to paths with different base stations (as in hard and soft handover) or to paths with different base station sectors (as in softer handover). The underlying resources are allocated using the predicted connection parameter and may include, for example, data processing and memory hardware resources, software resources, radio resources, etc. The resource allocation may also be established using both a predicted dynamic connection parameter along with one or more static connection parameters that are known at the time the connection is setup.

35 Claims, 4 Drawing Sheets

METHOD AND APPARATUS FOR RESOURCE RESERVATION IN A MOBILE RADIO COMMUNICATION SYSTEM

RELATED APPLICATION

This application claims priority from commonly-assigned, PCT International Application Number PCT/IB98/02078 filed on Dec. 18, 1998.

FIELD OF THE INVENTION

The present invention relates to reserving resources in a cellular radio communications system. One example and non-limiting application of the invention relates to advance reservation of data processing and memory resources needed to accommodate probable handover operations for a mobile radio connection.

BACKGROUND AND SUMMARY OF THE INVENTION

In a cellular radio communications system, a handover operation allows an established radio connection to continue when a mobile radio participating in that connection moves between cells in the system. Handover is typically initiated when the signal strength or signal quality of the radio connection with an origination base station falls below a predetermined threshold value. Often, a low signal strength or a poor signal quality indication means that the mobile station is near a border between two cells. If the mobile station moves closer to a destination cell or to a clearer line of unobstructed sight, handover of the radio connection to the destination cell usually results in improved radio transmission and reception.

In some cellular systems, a handover operation requires physically breaking the connection with the origination cell and then re-establishing the connection with the destination cell, i.e., a "break-before-make" switching operation. Such "hard" handover techniques are typically employed in Time Division Multiple Access (TDMA) and Frequency Division Multiple Access (FDMA) type cellular systems. On the other hand, "soft" handover techniques may be employed in Code Division Multiple Access (CDMA) type cellular systems. CDMA is an increasingly popular type of access for cellular communications because a higher spectrum efficiency is achieved compared to FDMA and TDMA techniques which means that more cellular users and/or services can be supported. In addition, a common frequency band allows simultaneous communication between a mobile station and more than one base station. Signals occupying the common frequency band are discriminated at the receiving station through spread spectrum CDMA waveform properties based on the use of a high speed, pseudo noise (PN) code. These high speed PN codes are used to modulate signals transmitted from the base stations and the mobile stations. Transmitter stations using different PN codes (or a PN code offset in time) produce signals that can be separately received at the receiving station. The high speed PN modulation also advantageously allows the receiving station to generate a received signal from a single transmitting station by combining several distinct propagation paths of the transmitted signal.

In CDMA, therefore, a mobile station need not switch frequency when handover of a connection is made from one cell to another. As a result, a destination cell can support a connection to a mobile station at the same time the origination cell continues to service the connection. Since the mobile station is always communicating through at least one cell during handover, there is no disruption to the call. Hence the term—"soft handover." In contrast to hard handover, soft handover is a "make-before-break" switching operation.

FIG. 1 is a high level diagram of a radio communications system 10 showing a soft handover operation. A radio network controller (RNC) 12 is coupled to adjacent base stations 14 and 18. Base station 14 serves a cell area 16, and base station 18 serves a cell area 20. Mobile stations 22 and 24 are located within cell 16, and mobile station 26 is located in cell area 20. Because mobile station 24 is near the border between cells 16 and 20, it has established communication links P1 and P2 with both base stations 14 and 18 which simultaneously support the connection with the mobile station 24. When a mobile station is in soft handover between two base stations, a single signal is created at the mobile station receiver from the two signals transmitted by each base station using a RAKE demodulation combination process. Those two signals are generated by the RNC "splitting" or broadcasting a downlink signal intended for the mobile station into two parallel identical signals with one being directed to the origination base station 14 and the other to the destination base station 18. In the opposite "uplink" direction, the mobile station transmitter broadcasts the signal to both base stations, and the signals are combined in the RNC 12. More than two base stations may be involved in a soft handover.

A similar operation may occur between sector cells of a common base station that employs plural antennas. The radio communications system 10 in FIG. 2 shows a base station 30 coupled to RNC 12 having multiple sectors Sec 0–Sec 5 where each sector includes one or more sector antennas. Mobile station 32 is located on the border of sectors 0 and 1. Demodulation elements at the base station 30 demodulate mobile station signals received at both sectors 0 and 1. Combining the demodulated mobile station signals from sectors 0 and 1 at the base station permits "softer handover" to take place. In other words, the mobile connection is supported by a destination sector before an origination sector no longer supports the connection.

Accordingly, soft and softer handover are highly desirable features of a mobile radio communications system based on spread spectrum CDMA because they offer make-before-break switching of a connection and also because they offer diversity combining of plural paths of the same signal. Diversity combining combats fading and interference. However, system resources must be allocated in order to carry out handover operations. In soft handover, for example, diversity handover units (DHOs) located in the RNC perform macro diversity combining of the connection information in the uplink (mobile-to-base) direction and macro diversity splitting of the connection information in the downlink (base-to-mobile) direction. Moreover, a single DHO entity (an entity may be implemented using software and/or hardware) may be employed for each service provided to a mobile station, i.e., a call may include several services like voice, video, and data services in a multimedia call. Because the number of DHO entities required to support a connection varies depending on the call, it is considered a dynamic service parameter. Services may also specify at the time of request certain radio interface type parameters like a particular bandwidth, e.g., peak or average bit rate, or a particular delay, e.g., maximum tolerable delay. These types of parameters are considered static. Ultimately, software and hardware resources must be allocated to support both dynamic and static service parameters. At a basic resource level, data processing and memory resources are required to support service parameters associated with a call connection with the mobile station.

Higher level resources like CDMA spreading codes and lower level resources like data processing and memory can be allocated at the time of a call setup for a requested service or at the time a known service is added or removed from a call by matching those resources needed for the requested service(s). On the other hand, there are other unknown services or services that are not explicitly requested that nevertheless require hardware and software resources. For example, a number of handover paths ultimately used to support a mobile station connection is not specified or known at the time of call setup. Indeed, the number of handover paths will likely vary depending upon the mobile station's location and on the current radio conditions in the mobile communications network. A mobile station that is in the center of a particular cell will likely employ fewer handover paths, and therefore, fewer associated resources are needed to support those paths as compared to a mobile station traveling to or located near the border between two or more cells. A mobile station in this latter situation will likely require more resources to support plural handover paths for a mobile connection.

To account for unspecified or unknown resources that nevertheless may be needed to support the connection at sometime during its life, a worst case resource reservation/allocation could be made for each connection at setup. If resources were unlimited, a worst case resource reservation/allocation would be a satisfactory solution despite being inefficient. But in the real world, resources are costly and/or limited, and efficiency is important. Accordingly, it is an objective of the invention to efficiently allocate a proper amount of resources (e.g., enough but not too many) to support the needs of a particular mobile connection.

Rather than suffering the inefficiency of overallocating resources in a worst case manner for each call, resources could be allocated in real time when needed. The problem with this approach is the delays that are inherently a part of such a real time resource allocation approach. In overload situations, if the resources are not available when needed and will not be in the foreseeable near future, it may be necessary to drop the call. It is therefore also an objective of the present invention to efficiently allocate resources in a timely fashion that keeps delays to a minimum.

The present invention overcomes these resource allocation problems and meets the above-stated and other objectives by predicting the amount of resources that will likely be necessary to support a connection with a mobile station before those resources are actually required. An unknown value of a dynamic connection parameter, like the number of radio paths likely to be involved in supporting the connection, is predicted. In the handover context, these radio paths might correspond to paths with different base stations (as in hard and soft handover) or to paths with different base station sectors (as in softer handover). The underlying resources are allocated using the predicted connection parameter and include for example data processing and memory hardware and software resources, radio resources, etc.

In a preferred example embodiment, the predicted connection parameter includes a number of diversity paths likely to be involved in supporting a connection in a CDMA cellular communications system, and the resources include CDMA spreading codes, diversity handover units (DHOs), data processing units, memory units, etc. For ease of description, an amount of resources may sometimes simply be defined generally in terms of "units." Of course, other predicted connection parameters and other resources may be included as well. An average number of diversity paths (and preferably a moving average) is determined based upon a number of diversity paths currently supporting other active mobile connections.

In another preferred example embodiment, resources are allocated based both on one or more "dynamic" connection parameters unknown at the time the connection is set up and on one or more "static" connection parameters known when the connection is set up. For example, a "dynamic" connection parameter includes a number of supporting paths likely to be used to support the connection. A static connection parameter includes (in this example) to a bandwidth or a maximum delay requested by a service associated with the connection.

The present invention may be implemented in a control node in a radio communications network where mobile stations communicate with the radio network via base stations over a radio interface. Each base station is associated with at least one geographic cell area. The control node includes a communications controller that initiates establishment of a connection between the radio communications network and a mobile station. The control node further includes a resource controller coordinating with the communications controller to allocate resources to support the connection based upon a predicted connection parameter, e.g., a predicted number of diversity handover paths, that may be involved in supporting a connection.

In the diversity handover path connection parameter example, the resource controller determines the predicted number of paths based upon a number of current paths per mobile station with plural base station cells for active connections being supported in the radio network. The plural base station cells may be associated with one base station (a cell is associated with a base station sector) or with plural base stations (each cell is associated with a base station). If the resource controller is located in a base station, the paths correspond to different base station sectors. Alternatively, the resource controller may be located in a radio network controller coupled to plural base stations where the paths correspond to different base stations.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. For example, the present invention may be applied advantageously to predict a number of radio paths (in the context of hard, soft, or softer handover) likely to be used to support a radio connection with a mobile station. However, the present invention may also be used to predict other parameters likely to be used to support a radio connection with a mobile station in order to efficiently and timely allocate resources need to support the connection. In other instances, detailed descriptions of well-known methods, interfaces, devices, and signaling techniques are omitted so as not to obscure the description of the present invention with unnecessary detail.

Figure 1:
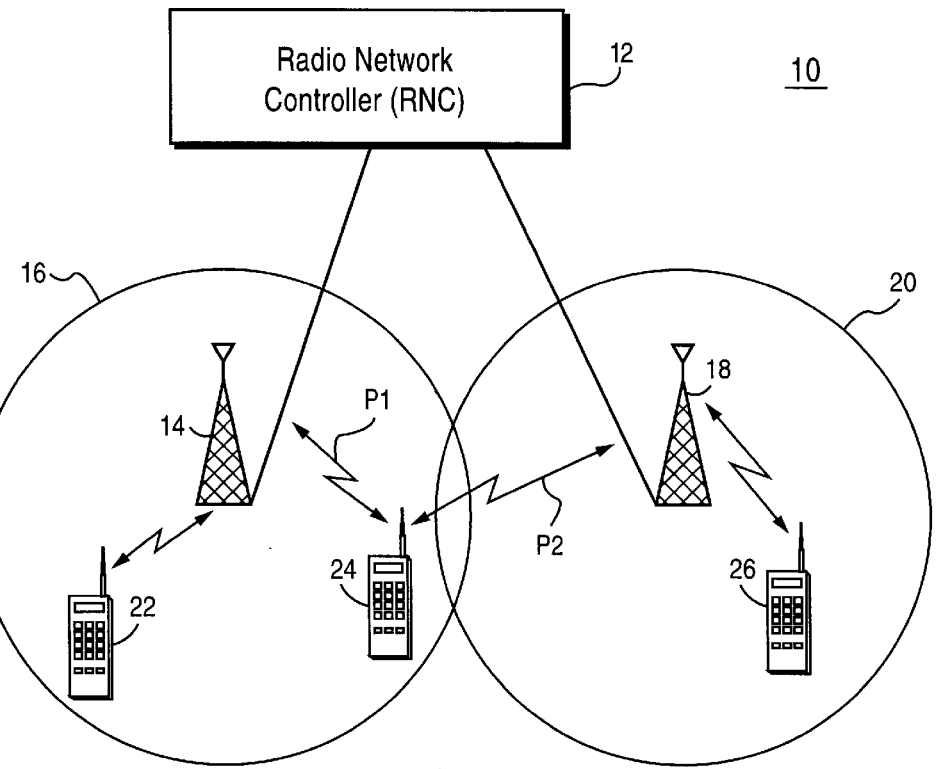
FIG. 1 is a diagram of a radio communications system illustrating soft handover.
Figure 2:
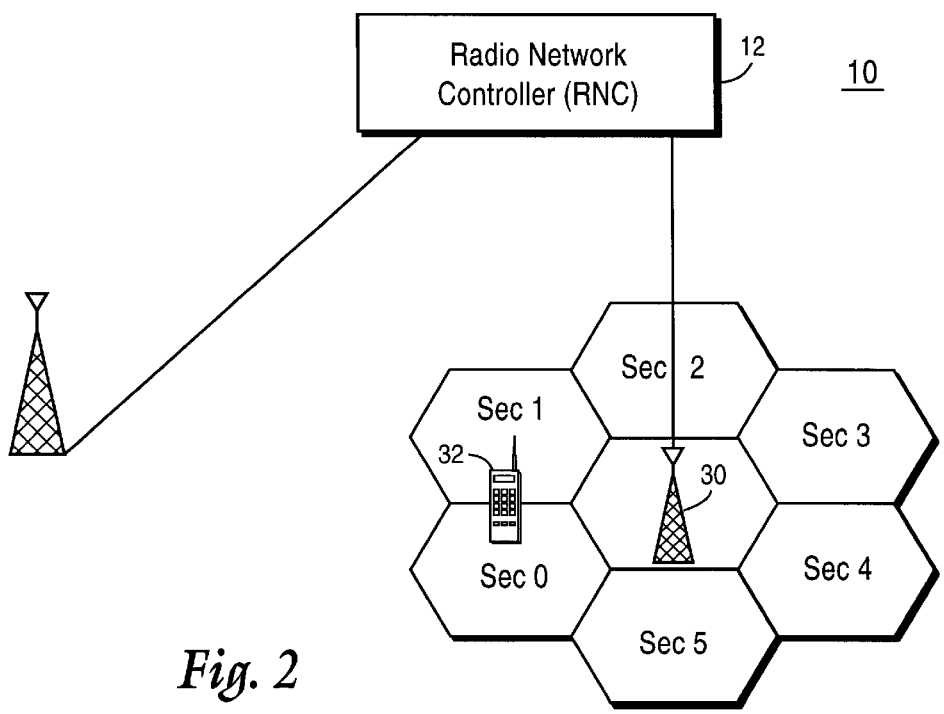
FIG. 2 is a diagram a radio communications system illustrating softer handover.

The present invention may be implemented in any type of mobile communications system such as that shown in FIGS. 1 and 2. However, the present invention is particularly advantageous applied in the context of a spread spectrum ode Division Multiple Access (CDMA) mobile communications system because of he benefits provided in such a system, e.g., CDMA-type communications permit soft and softer handover as described above. However, the present invention is also applicable to communications using other types of access such as FDMA and TDMA where typically only hard handover is permitted.

Figure 3:
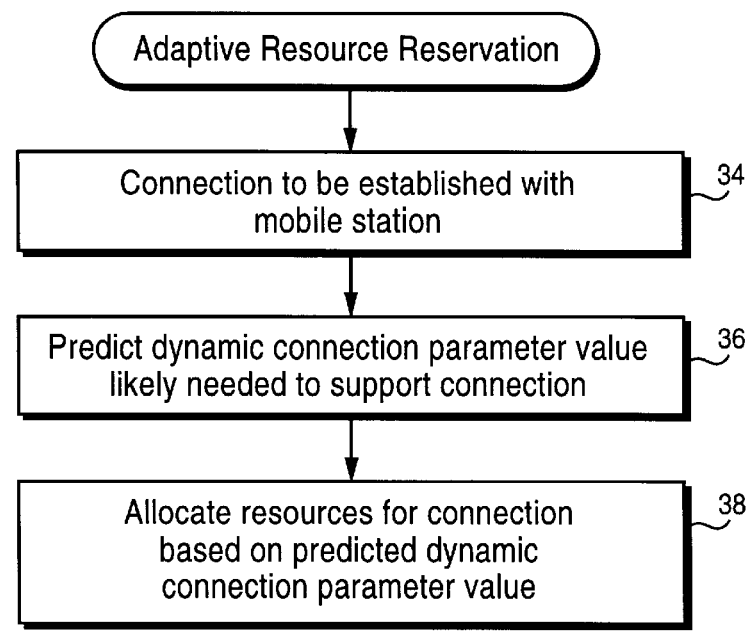
FIG. 3 invention is a flowchart diagram relating to dynamic resource reservation in accordance with a general embodiment of the invention.

The adaptive resource handling of the present invention will now be described in conjunction with general procedures performed by a radio network control node such as a radio network controller 12 or a base station (14, 18, 30) in radio communications network 10 illustrated in the flowchart of FIG. 3. Initially, a request to establish a connection with the mobile station is received (block 34). In the course of establishing that connection, the control node determines the radio, data processing, and other resources necessary to support that connection. To make an optimal determination, the control node predicts a dynamic connection parameter value needed to support the connection (block 36). The dynamic connection parameter value is not specified by the request or otherwise is not known at the time. As described above, a non-limiting example of a dynamic connection parameter value that may be predicted is a number of diversity paths likely to be needed to support the connection sometime during its lifetime.

The control node then allocates appropriate resources for the connection based upon the predicted dynamic connection parameter value (block 38). The resources may include one or more of the following: software resources like spreading codes in a CDMA system, and hardware resources like radio transceiving equipment, diversity handover units, CPU time, and memory space.

Figure 4:
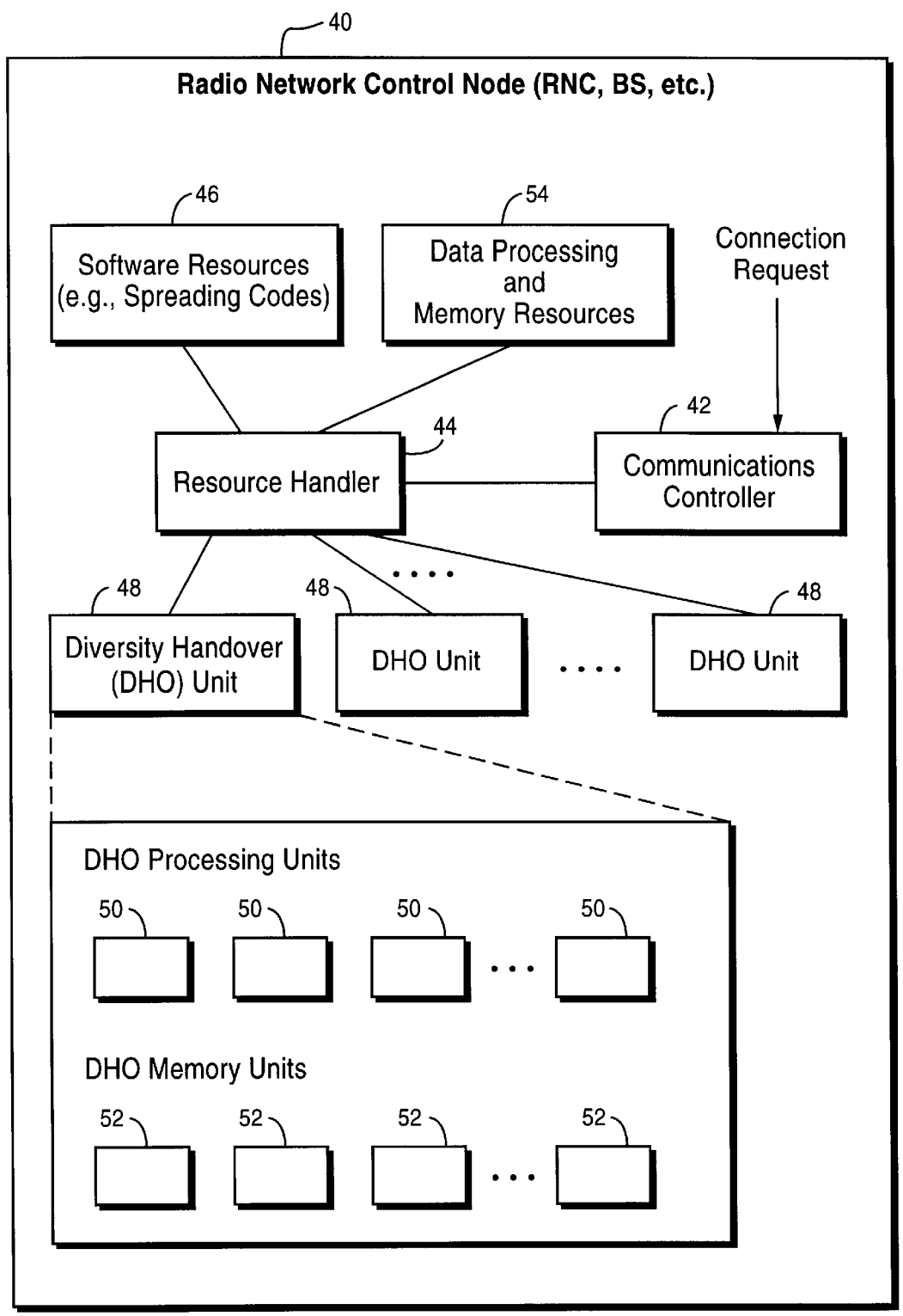
FIG. 4 is a function block diagram of a radio network control node in accordance with an example, non-limiting embodiment of the present.

An example radio network control node 40 is illustrated in the function lock diagram of FIG. 4. The radio network control node may be implemented in he radio network controller 12 coupled to base stations 14 and 18, or it may be implemented in a base station controller within a single base station, e.g., the base station 30 shown in FIG. 2. The radio network control node 40 includes a communications controller 42 which receives and responds to requests to establish (and de-establish) a connection with a mobile station. The communication controller 42 is coupled to a resource handler 44 which controls the reservation and allocation of different types of resources including software resources 46 like CDMA spreading codes and hardware resources like diversity handover (DHO) units 48 and data processing and memory resources 54.

Each diversity handover unit 48 is a resource in and of itself. Moreover, each diversity handover unit 48 also includes data processing and memory capacity resources. Plural DHO processing units 50 and plural DHO memory units 52 are shown which are used to support the diversity handover operations of a single DHO unit 48. In a wideband CDMA system, each diversity handover unit 48 handles one of the protocol layers within a protocol stack used to implement each call service. Each protocol layer handles one or several functions related to a service. For example, a packet data service may be implemented as a radio protocol stack with the following layer 2 protocol layer functions handled in the RNC: segmentation/assembly of data, scheduling of data on a radio channel to make sure that the RNC does not provide the radio channel with more data than it can currently handle, data retransmission, and diversity combining/splitting.

In the downlink direction from base to mobile station, the data flow from the protocol layer 3 above the DHO unit is assembled into radio frames that are split and sent to the base stations involved in the diversity handover. This process includes the following example tasks: receiving data from higher protocol layer, assembling radio frames and storage in an output buffer, and sending one radio frame per soft handover path. In the opposite uplink direction, radio frames received from different soft handover paths are evaluated, and the best quality data stream is chosen. This process includes the following example tasks: storing received radio frames from the different soft handover paths in input buffers, internal processing of received radio frames, selecting the best radio frames based on quality information, and forwarding chosen radio frame data to the overlaying protocol layer 3.

The resource handler 44 reserves and allocates software and/or hardware resources using static parameters and/or dynamic parameters pertinent to a mobile connection. Static parameters include those specified in or requested by the service(s) associated with the connection request. Examples include: a desired bandwidth, a particular delay parameter such as a maximum tolerated delay, maximum bit rate, average bit rate, bit rate error, etc. Static parameters may include other parameters known at the time the connection is set up. Dynamic parameters include parameters that affect the connection in some way and whose values typically can not be specified or known in advance or at the time of establishing the mobile connection. As a result, the resource handler 44 predicts a value for one or more dynamic parameters for a mobile connection, e.g., a number of handover paths (including hard and soft handover) or diversity paths (e.g., for soft or softer handover) that may be involved in supporting the mobile connection during the life of that connection.

Figure 5:
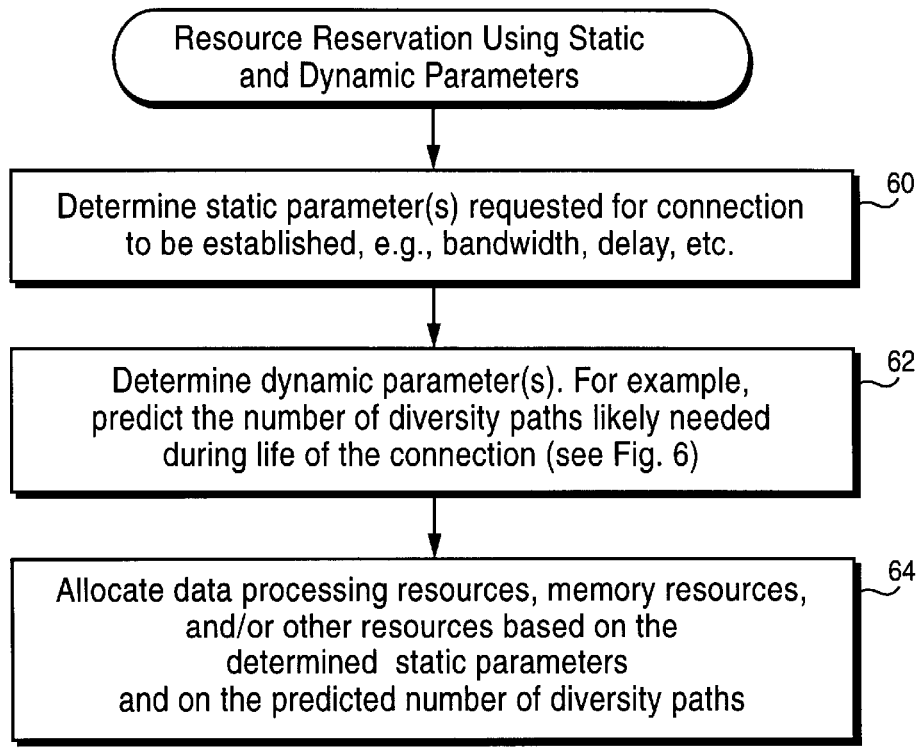
FIG. 5 is a flowchart diagram relating to resource reservation based on both static and dynamic parameters.

The resource handler 44 may take into account both static parameter values and predicted dynamic parameter values in allocating resources for the connection. One method for reserving resources using both static and dynamic parameters is now described in conjunction using the flowchart shown in FIG. 5.

When a mobile connection request is received at the communications controller 42, one or more services are requested with that connection. Using those requested services, and pertinent service parameters, such as a peak or an average bit rate and/or a maximum tolerated delay, the resource handler 44 determines and reserves those hardware and/or software resources needed to support the requested service(s) (block 60). In addition, the resource handler 44 also determines one or more dynamic parameters. For example, the resource handler 44 may predict a number of diversity paths likely needed to support the mobile connection during its lifetime (block 62). An example of a prediction algorithm that may be employed is described below in conjunction with FIG. 6. The resource handler 44 then reserves or allocates for the mobile connection data processing, memory, and/or other resources based on the determined static and dynamic parameter values (block 64). For example, a number of DHO units 48 or a number of DHO processing units 50 and memory units 52 in a single DHO unit 48 may be reserved for the mobile connection. One way of gauging resource amount in the context of DHO units is that for each DHO unit 48 required to support macro diversity during the lifetime of the connection, the amount data processing and memory resources needed is approximately proportional to the number of diversity paths connected to the DHO.

Continuing with diversity paths as an example of a dynamic connection parameter, an average number of diversity paths may be predicted by the resource handler 44. Preferably, the resource handler 44 calculates a moving average of the number of diversity paths being used per connection for current calls (ongoing or recently completed) in the same geographical area as the mobile station. Such a calculation may be made in a single cell where the current mobile is located, in plural cells, in one or more location or routing areas, etc. The general term "cell" is used in the following description.

Figure 6:
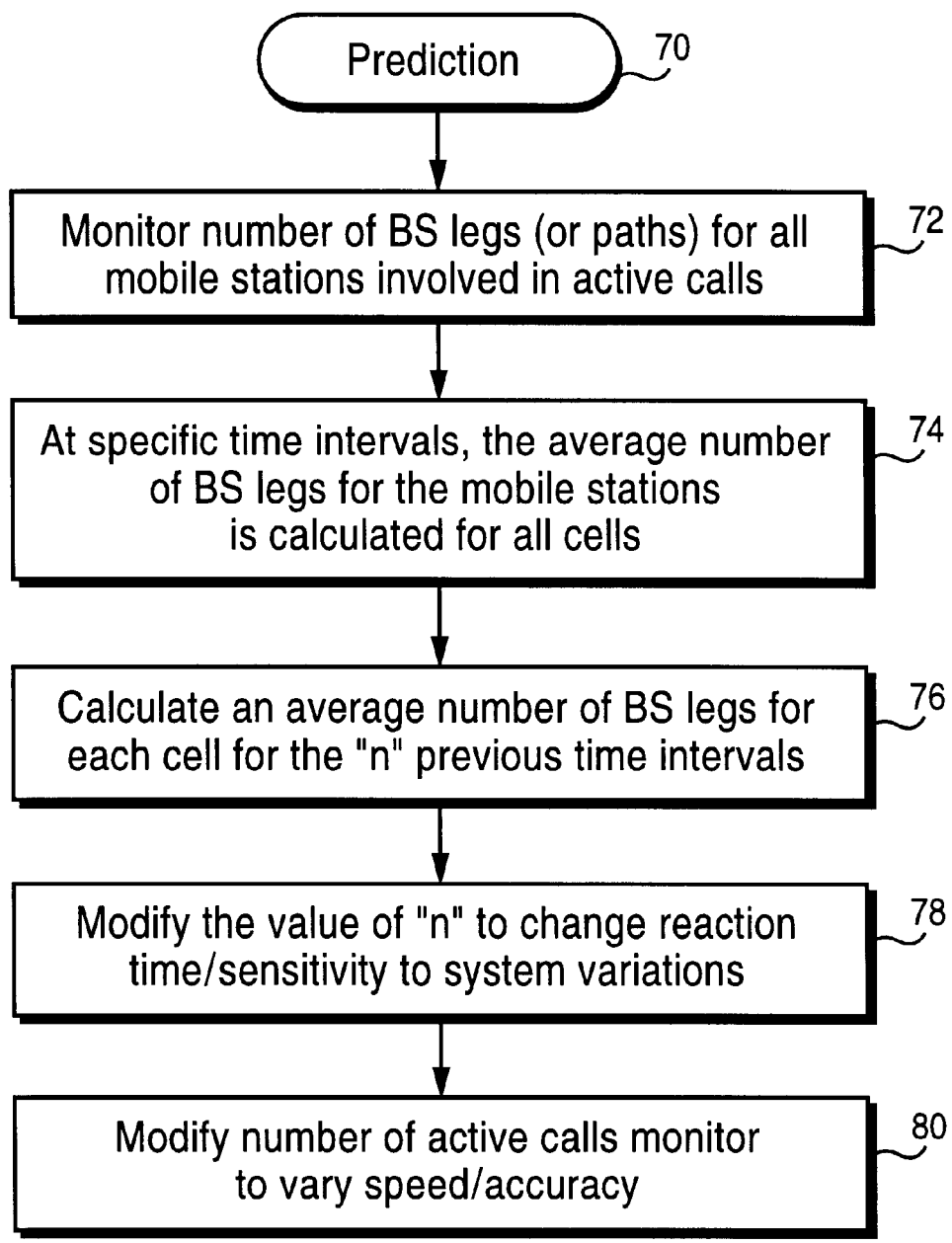
FIG. 6 is a flowchart diagram outlining example procedures for predicting a number of diversity legs likely to be involved in supporting a mobile radio connection to be or being established.

An example prediction routine (block 70) is now described in conjunction with the flowchart in FIG. 6. The resource handler 44 monitors the number of base station legs or paths for all base stations involved in active calls (block 72). A base station leg typically corresponds to a service provided on a connection between a base station and a mobile station. Thus, a connection includes plural base station legs if it support plural services between the mobile station and the radio network. Each service is usually handled individually and therefor has its own DHO unit. In soft handover, plural base station legs exist between the mobile and plural base stations. In softer handover, plural base station legs exist between the mobile and plural base station sectors.

At specific time intervals, the resource handler 44 calculates the average number of base station legs for the mobile stations for all cells, for a subset of cells, or for one cell (block 74). A cell defines an area associated with a base station or a base station sector. An average number of base station legs per cell is calculated for "n" previous time intervals, where n is an integer (block 76). The value of n may be modified to change the reaction time/sensitivity of the prediction to system variations (block 78). A larger time window means that the system reacts more slowly meaning that the moving average prediction value may be somewhat dated/less accurate. However, a larger time window may result in more stable resource handling and allocation. Conversely, a shorter time window may provide a more accurate reflection of the number of base station legs currently involved in diversity operations in the system. Another parameter that can be modified is the number of active calls that are actually monitored (block 80). Monitoring a larger number of active calls (which may require monitoring calls in another cell) may increase the accuracy of the average, but on the other hand, reduce the speed at which the prediction is made. Conversely, a fewer number of active calls increases the speed of prediction but may reduce the accuracy.

Table 1 below shows a simplified example of a table maintained for each cell to show the average number of base station legs per diversity handover unit within the cell.

TABLE 1

DHO/BS leg per cell

| Cell | Average number of BS legs per DHO within a cell |
|---|---|
| cell1 | 1.7 |
| cell2 | 1.4 |
| . | |
| . | |
| . | |
| cell n | 2.4 |

As described above, the prediction of one or more dynamic parameter values is advantageously combined with one or more "static" parameters such as bandwidth and delay by the resource handler in reserving/allocating resources for a particular mobile connection. Table 2 below is an example of parameter values that might be determined by the resource handler 44.

TABLE 2

DHO Resource Handling

| Service | Bandwidth (kbit/s) | Delay (ms) | Number of BS Legs | Required Processing Capacity (mips)[a] | Required Memory Capacity (kbyte) |
|---|---|---|---|---|---|
| Speech (coded) | 13 kbit/s | 10 ms | 1 | 1 | 3 |
| Speech (coded) | 13 kbit/s | 10 ms | 2 | 1.5 | 6 |
| Speech (coded) | 13 kbit/s | 10 ms | 3 | 2 | 9 |
| Packet Data | 64 | 10 ms | 1 | 4 | 12 |
| Packet Data | 64 kbit/s | 10 ms | 2 | 8 | 24 |
| Packet Data | 64 kbit/s | 10 ms | 3 | 12 | 36 |
| Etc. | . | . | . | . | . |
| | . | . | . | . | . |
| | . | . | . | . | . |

[a]The processing capacity can be expressed in other terms; mips is just an example.

In this non-limiting example, the predicted value of the number of base station legs obtained from Table 1 is used together with Table 2 information to determine the processing and memory requirements for a specific service or services. The values of Table 2 may be determined in advance by calculating the processing and memory requirements needed for a specific service for various cases, i.e., one, two, three, etc. BS legs. This requirements calculation may be made by the DHO unit function designer.

Thus, the reservation and allocation of data processing and memory resources such as required for DHO units is therefore based upon static service parameters and on a prediction of an average number of diversity paths in one or more cells. Rather than allocating for the worst case scenario, the present invention permits a more realistic allocation of resources actually needed to support a connection which translates into more efficient and optimum use of limited resources. Ultimately, this efficiency improves the capacity of the mobile radio communications system.

Increased efficiency may be seen in the following example:

Processing/memory capacity=$S1\times((N1\times S1\text{Leg1cap})+(N2\times S1\text{Leg2cap})+(N3\times S1\text{Leg3cap}))+S2\times((N1\times S2\text{Leg1cap})+(N2\times S2\text{Leg2cap})+(N3\times S2\text{Leg3cap}))$, where S<n>=percentage of DHO units used for service n
N<n>=percentage of the DHO units with n BS leg(s) connected S<n>Leg<m>cap=processing/memory capacity needed for DHO executing service n with m BS legs.

Assume that the values given in Table 2 are used and that the active calls have a distribution of the number of BS legs involved in macro diversity as:

⅓ of the calls->1 leg in macro diversity
⅓ of the calls->2 legs in macro diversity
⅓ of the calls->3 legs in macro diversity.

The third assumption is that ⅔ of calls is speech and ⅓ is packet data calls.

The worst case allocation approach results in:

Processing Capacity=$\frac{2}{3}\times((\frac{1}{3}\times2.0)+(\frac{1}{3}\times2.0)+(\frac{1}{3}\times2.0))+\frac{1}{3}\times((\frac{1}{3}\times12)+(\frac{1}{3}\times12)+(\frac{1}{3}\times12))=5.33$ Memory Capacity=$\frac{2}{3}\times((\frac{1}{3}\times9)+(\frac{1}{3}\times9)+(\frac{1}{3}\times9))+\frac{1}{3}\times((\frac{1}{3}\times36)+(\frac{1}{3}\times36)+(\frac{1}{3}\times36))=18$ The invention results in:

Processing Capacity=$\frac{2}{3}\times((\frac{1}{3}\times1)+(\frac{1}{3}\times1.5)+(\frac{1}{3}\times2.0))+\frac{1}{3}\times((\frac{1}{3}\times4)+(\frac{1}{3}\times8)+(\frac{1}{3}\times12))=3.67$ Memory Capacity=$\frac{2}{3}\times((\frac{1}{3}\times3)+(\frac{1}{3}6)+(\frac{1}{3}9))+\frac{1}{3}\times(\frac{1}{3}12)+(\frac{1}{3}24)+(\frac{1}{3}36))=12$ This example results in a data processing capacity improvement of:

$(5.33-3.67)/3.67=45\%$ and a memory capacity improvement of $(18-12)/12=50\%$.

The present invention, applied to DHO units as described, may also be used for other functions, operations, and services employed in mobile radio communications. Within a wideband CDMA system, for example, the RNC handles the termination of several other radio protocol layers besides the DHO layer. Examples of such other protocol layers include: the RLC protocol layer described above, a ciphering protocol layer, and the MAC layer as described above. These protocol layers need data processing and memory resources in a similar way as for the DHO protocol layer. The amount of data processing and memory resources needed for the RLC and the MAC layers per mobile station depends on which services are set up between the mobile station and the RNC.

Different kinds of services, e.g., data services, speech services, etc., require different types and amounts of resources. A prediction may be made of the traffic behavior of the mobile subscriber based on the subscriber location and the time of day to assist in how best to allocate the type and amount of data processing and memory resources. The prediction could, for example, be an average number of services that a mobile subscriber establishes simultaneously. This average value (Possibly together with the predicted average number of DHO legs) may then be used to reserve processing and memory resources, e.g., radio link control, ciphering, and scheduling of data transport.

The mobility of the mobile station may also be taken into account. As described above, the number of DHO units needed assuming a mobile station remains within a specific cell is predicted at call setup. However, the mobile station may move to other cells during the life of the call. The number of DHO units needed may vary during the life of the call depending on which cells the mobile station passes by or through, resulting in a corresponding variance in the processing and memory resources needed for the DHO function. Fortunately, statistics show that the average call time is rather short which means that most mobile stations will be located in the same cell during the life of the call. Nonetheless, these instances where the mobile station moves significantly during a call may be taken into account. It can be assumed that there is a relationship between the number of DHO units and the predicted value used at resource allocation at call setup. The needed processing and memory resources for the predicted number of DHO units can be mapped to one microprocessor which handles the processing and memory demands of the DHO units. In mapping DHO units to a physical processor, a buffer of spare processing/memory capacity may be reserved. This reserved capacity will make sure that the rapid changes of the traffic situation can be accommodated.

While the present invention has been described with respect to a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. In a mobile radio communications system including plural mobile stations coupled over a radio interface to a radio network with plural base stations, a method comprising:

determining that a connection is to be established with one of the mobile stations;
   predicting a number of diversity handover paths likely to be involved in supporting the connection, each diversity handover path corresponding to a base station-to-mobile station radio link used to support the connection with the mobile station at some point during the life of the connection and
   allocating resources for the connection based on the predicted number of supporting diversity handover paths.

2. The method in claim 1, wherein the radio network includes plural base stations coupled to a radio network controller, the predicting step includes predicting a number of base stations involved in supporting the connection, and the diversity handover paths include a number of base station legs used to support the connection.

3. The method in claim 1, wherein the radio network includes plural base stations, the predicting step includes predicting a number of base station sectors involved in supporting the connection, and wherein diversity the handover paths include a number of base station sector legs used to support the connection.

4. The method in claim, 1 wherein the predicting step includes predicting a moving average of a number of diversity handover paths that may be involved in supporting the connection.

5. The method in claim 1, wherein the resources include data processing and memory capacity resources.

6. The method in claim 1, wherein the resources include diversity handover resources.

7. The method in claim 1, further comprising:
determining another parameter associated with the connection,
wherein the allocating step includes: allocating resources for the connection based on the predicted number of supporting diversity handover paths and on the determined other parameter.

8. The method in claim 7, wherein the other parameter includes a bandwidth or a delay requested by a service associated with the connection.

9. The method in claim 7, wherein the other parameter includes a data processing capacity or a memory capacity associated with the connection.

10. The method in claim 1, wherein the predicting step includes predicting an average number of diversity handover paths including:
monitoring a number of diversity handover paths for active mobile station connections, and
at a predetermined time interval, calculating the average number of diversity handover paths for active connections.

11. The method in claim 10, wherein a variable number of diversity handover paths is monitored.

12. The method in claim 10, further comprising:
setting the predetermined time interval depending upon a desired speed of response to changing handover path conditions.

13. A control node for use in a radio communications network where mobile stations communicate with base stations over a radio interface, each base station being associated with at least one geographic cell area, comprising:
a communications controller configured to initiate establishment of a connection between the radio communications network and a mobile station; and
a resource controller, coupled to the communications controller, configured to allocate resources to support the connection based on a predicted number of handover paths likely to be involved in supporting the connection, each handover path corresponding to a base station-to-mobile station radio link used to support the connection with the mobile station,
wherein the handover paths are diversity soft or softer handover paths that, for some portion of time, support the connection during the same time.

14. The control node in claim 13, wherein the resource controller is configured to determine the predicted handover number of paths based on a number of diversity handover paths in a base station cell in which the mobile station is located when the connection is established.

15. The control node in claim 13, wherein the resource controller is configured to determine the predicted number of diversity handover paths based on a number of diversity handover paths per mobile station in plural base station cells in the radio network.

16. The control node in claim 13, wherein the statistical algorithm includes an averaging calculation.

17. The control node in claim 13, wherein the resource controller is located in a base station, and wherein the diversity handover paths are from plural base station sectors.

18. The control node in claim 13, wherein the resource controller is located in a radio network controller coupled to plural base stations, and wherein the diversity handover paths are from different base stations.

19. The control node in claim 13, wherein the resources include data processing and memory capacity resources.

20. The control node in claim 13, wherein the resource controller is configured to determine the predicted number of diversity handover paths per mobile station based on an average number of diversity handover paths in one or more cells in the radio network.

21. In a mobile radio communications system including plural mobile stations coupled over a radio interface to a diversity with plural base stations, a method comprising:
determining that a connection is to be established with one of the mobile stations;
predicting a likely number of diversity handover links needed to support the connection at some point during the life of the connection; and
allocating resource capacity for the connection based on the predicted dynamic connection parameter.

22. The method in claim 21, wherein the average number is determined using information from a cell in which the connection with the mobile station is initially established.

23. The method in claim 21, wherein the average number is determined using information from plural cells in the radio network.

24. The method in claim 21, further comprising: varying a time period over which the average number is determined.

25. The method in claim 21, further comprising:
determining the value of the number of diversity handover links for a number of earlier established connections, and
wherein the predicting step includes predicting the number of diversity handover links based on the determined value.

26. The method in claim 25, further comprising:
varying the number of earlier established connections.

27. The method in claim 21, further comprising:
determining a static parameter requested for the connection, and
allocating resource capacity for the connection also based on the determined static parameter.

28. The method in claim 27, wherein the static parameter is radio bandwidth.

29. The method in claim 27, wherein the number of radio communication handover links is a number of base stations or base station sectors supporting the connection at some point during the life of the connection.

30. The method in claim 27, wherein the static parameter is a delay parameter.

31. A resource controller for use in a radio communications network, communicating with mobile stations via one or more base stations, and programmed to perform the following computer-executable tasks to support a connection with a mobile station:
determine a diversity path parameter associated with a diversity handover operation involving the connection using diversity path values determined for other active mobile connections; and reserve resources to support the connection based on the predicted parameter.

32. The resource controller in claim 31, wherein the resources include a number of diversity handover units.

33. The resource controller in claim 31, wherein the resources are diversity resources and include an amount of memory needed for the predicted diversity handover parameter.

34. The resource controller in claim 31, wherein the resources are diversity resources and include an amount of data processing resources needed for the predicted diversity handover parameter.

35. The method in claim 21, further comprising:

monitoring a number of diversity handover paths for active mobile station connections, and at a predetermined time interval, calculating an average number diversity handover paths for active connections, wherein the dynamic connection parameter is the average number of diversity handover paths for active mobile connections in a particular area.

* * * * *